United States Patent Office 3,316,157
Patented Apr. 25, 1967

3,316,157
SYNTHESIS OF STEROIDS
Patrick Andrew Diassi, Westfield, and Pacifico Anthony Principe, South River, N.J., assignors to E. R. Squibb & Sons, Inc., New York, N.Y., a corporation of Delaware
No Drawing. Original application Dec. 18, 1963, Ser. No. 331,627. Divided and this application June 2, 1965, Ser. No. 473,262
3 Claims. (Cl. 195—51)

This application is a division of our application Ser. No. 331,627, filed Dec. 18, 1963, and now abandoned.

This invention relates to and has as its objects the provision of a new process for the preparation of physiologically active steroids.

The final products of this invention may be represented by the following formula:

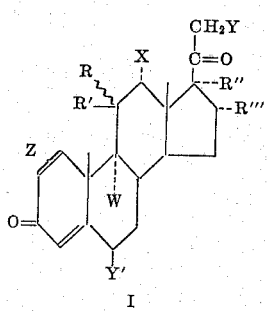

I wherein Z is a single or double bond; R' is hydrogen, R is α or β-hydroxy; and together R and R' is oxo (O=); X is lower alkyl (e.g. methyl ethyl); Y is selected from the group consisting of hydrogen, hydroxy and acyloxy; Y' is selected from the group consisting of hydroxy and acyloxy; W is hydrogen or halo (e.g. bromo, fluoro, or chloro); and R" and R''' are each selected from the group consisting of hydrogen and hydroxy and together R" and R''' is

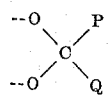

wherein P is selected from the group consisting of hydrogen, lower alkyl, halo lower alkyl, monocyclic aryl, monocyclic aryl lower alkyl, monocyclic heterocyclic or monocyclic heterocyclic lower alkyl; Q is selected from the group consisting of lower alkyl, halo lower alkyl, monocyclic cycloalkyl, monocyclic cycloalkyl lower alkyl, monocyclic aryl, monocyclicaryl lower alkyl, monocyclic heterocyclic or monocyclic heterocyclic lower alkyl; or together with the carbon to which they are joined P and Q is a monocyclic cycloalkyl or monocyclic heterocyclic radical.

The preferred acyl and acyloxy radicals are those of hydrocarbon carboxylic acids of less than twelve carbon atoms, as exemplified by the lower alkanoic acids (e.g. acetic, propionic, butyric and tert-pentanoic acids), the lower alkanoic acids, the monocyclic aryl carboxylic acids (e.g. benzoic and toluic acids), the monocyclic aryl lower alkanoic acids (e.g. phenacetic and β-phenylpropionic acid), the cycloalkane carboxylic acids and the cycloalkene carboxylic acids.

[In this application and in the appended claims, whenever in the formulae set forth therein a curved line (∫) is employed in the linkage of atoms, it is meant to denote that the connected atom may be either in the α or β position as is determined in the respective compounds involved.]

The final products of this invention are physiologically active compounds which possess mineralocorticoid activity and thus may be employed instead of deoxycorticosterone, for example, in the treatment of Addison's disease, for which they can be administered in the same manner as deoxycorticosterone, for example, the dosage being adjusted for the relative potency of the particular steroid.

The final products of this invention may be prepared according to the process of this invention beginning with compounds of the formula:

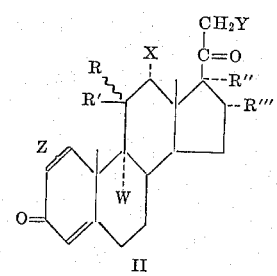

II wherein R, R', Y, R", R''', W, Z and X are as hereinbefore defined, as starting material. Among the starting materials which may be employed in the practice of this invention are included, inter alia, 12-alkyl-11-oxygenated progesterone, for example,
  12α-methyl-11-ketoprogesterone,
  12α-methyl-11β-hydroxyprogesterone, and
  12α-methyl-11α-hydroxyprogesterone;
12-alkylcorticosterone, for example,
  12α-methylcorticosterone;
12-alkyl-halo-11-hydroxyprogesterone, for example,
  12α-methyl-9α-fluoro-11β-hydroxyprogesterone,
  12α-methyl-9α-chloro-11β-hydroxyprogesterone,
  12α-methyl-9α-bromo-11β-hydroxyprogesterone;
12-alkyl-11β-16α-dihydroxyprogesterone, for example,
  12α-methyl-11β,16α-dihydroxyprogesterone;
12-alkyl-16-dehydro-11β-hydroxyprogesterone, for example,
  12α-methyl-16-dehydro-11β-hydroxyprogesterone;
12-alkyl-11β,16α,17α-trihydroxyprogesterone, for example,
  12α-methyl-11β,16α,17α-trihydroxyprogesterone;
16,17-acetal and ketal derivatives of 12-alkyl-11β,16α,17α-trihydroxyprogesterone, for example,
  12α-methyl-11β,16α,17α-trihydroxyprogesterone 16,17-acetonide,
  12α-methyl-11β,16α,17α-trihydroxyprogesterone 16,17-acetophenonide;
12-alkyl-16-dehydrocorticosterone, for example,
  12α-methyl-16-dehydrocorticosterone;
12-alkyl-16-hydroxyhydrocortisone, for example,
  12α-methyl-16α-hydroxyhydrocortisone;
16,17-acetal and ketal of 12-alkyl-16-hydroxyhydrocortisone, for example,
  12α-methyl-16α-hydroxyhydrocortisone 16,17-acetonide,
  12α-methyl-16α-hydroxyhydrocortisone 16,17-acetophenoide;
12α-methyl-11-dehydrocorticosterone and the Δ¹-derivatives of all the foregoing starting materials.

The starting material of this invention is subjected to the actions of a microorganism of the genus Trichothecium, or to the actions of the enzymes thereof, under oxidizing conditions. This oxidation can best be effected either by including the starting material in an acrolice culture of the microorganism, or by bringing together in an aqueous medium, the compounds, air and enzymes of nonproliferating cells of the microorganism.

The microorganism employed in this invention is of the genus Trichothecium, and is more specifically, *Trichothecium roseum*.

In general, the conditions of culturing the Trichothecium microorganism for the purpose of this invention are except for the inclusion of the starting material to be converted), the same as those of culturing various other microorganisms for the production of antibiotics, vitamin $B_{12}$, and other like substances. The microorganism is grown aerobically in contact with (in or on) suitable fermentation medium. A suitable medium essentially comprises a source of carbon and energy. The latter may be a carbohydrate, for example, molasses, glucose, maltose, starch or dextrin, a fatty acid, a fat and/or the compound itself. Preferably, however, the medium includes an assimilable source of carbon and energy in addition to the steroid. Among the fats utilizable for the purpose of this invention are lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein and trilaurin. Among the fatty acids utilizable for the purpose of this invention are stearic acid, palmitic acid, oleic acid, linoleic acid and myristic acid.

The source of nitrogenous factors utilizable for the purposes of this invention may be organic (e.g., soybean meal, cornsteep liquor, yeast extract, meat extract and/or distillers' solubles) or synthetic (i.e., composes of simple, synthesizable organic or inorganic compounds, such as ammonium salts, alkali nitrates, amino acids or urea).

An adequate sterile air supply should be maintained during fermentation, for example, by the conventional methods of exposing a large surface of the medium to air or by utilizing submerged aerated culture. The starting compound may be added to the culture during the incubation period, or included in the medium prior to sterilization or inoculation. The preferred (but not limiting) range of the concentration of the compound in the culture is about 0.01% to about 0.1%. The period (or rather the time of subjecting the compound to the action of the enzyme) may vary considerably, the range of about twenty-four to ninety-six hours being feasible, but limiting.

This microbial process yields the 6-hydroxy derivatives of the respective starting material. These 6-hydroxy compounds may then be acylated as by treatment with an acyl halide or acid anhydride of a hydrocarbon carboxylic acid of less than twelve carbon atoms in the presence of a base, for example, pyridine, to yield the 6,21-diacyloxy derivatives of the starting material, the compounds of Formula I.

This invention may be illustrated by the following examples:

EXAMPLE 1

*12α-methyl-6β-hydroxy-11-dehydrocorticosterone*

Surface growth from a two-week old agar slant of *Trichothecium roseum* (ATCC12519), the slants containing as a nutrient medium (A): Glucose, 10 g.; yeast extract, 2.5 g.; $K_2HPO_4$, 1 g.; agar, 20 g.; distilled water to 1 liter, is suspended in 5 ml. of a 0.01% Dupanol aqueous solution [Merck Index, 7th Edition (1960), p. 472]. One milliliter portions of this suspension are used to inoculate four 250 ml. Erlenmeyer flasks, each containing 50 ml. of the following sterilized medium (B): Dextrose, 10 g.; corn steep liquor, 6 g.; $NH_4H_2PO_4$, 3 g.; yeast extract, 2.5 g.; $CaCO_3$, 2.5 g.; distilled water to 1 liter. After 72 hours incubation at 25° C. with continuous rotary agitation (280 cycles per minute, 2 inch radius) 10% (vol./vol.) transfers are made to 20–250 ml. Erlenmeyer flasks, each containing 50 ml. of freshly sterilized medium (B) plus 100 micrograms/ml. of 12α-methyl-11-dehydrocorticosterone. The steroid was added by supplementing each flask with 0.25 ml. of a sterile solution of the steroid in N,N-dimethylformamide containing 20 mg./ml. of steroid. A total of 100 mg. is fermented. After 35 hours of further incubation, using the same conditions as described above, the contents of the flasks are pooled and filtered through a Scitz clarifying pad. The flasks, mycelium and pads are washed with successive 50 ml. portions of warm water. The combined filtrate and washings have a volume of 1000 ml.

The filtrate is extracted three times with 300 ml. portions of chloroform which are combined, washed twice with 450 ml. portions of water and evaporated to dryness in vacuo, to yield 12α-methyl-6β-hydroxy-11-dehydrocorticosterone.

EXAMPLE 2

Following the procedure of Example 1, but substituting an equivalent amount of each of the following compounds, 12α-methyl-11-ketoprogesterone;
12α-methyl-11β-hydroxyprogesterone;
12α-methyl-11α-hydroxyprogesterone;
12α-methylcorticosterone;
12α-methyl-9α-fluoro-11β-hydroxyprogesterone;
12α-methyl-9α-chloro-11β-hydroxyprogesterone;
12α-methyl-9α-bromo-11β-hydroxyprogesterone;
12α-methyl-11β,16α-dihydroxyprogesterone;
12α-methyl-16-dehydro-11β-hydroxyprogesterone;
12α-methyl-11β,16α,17α-trihydroxyprogesterone;
12α-methyl-11β,16α,17α-trihydroxyprogesterone
  16,17-acetonide;
12α-methyl-11β,16α,17α-trihydroxyprogesterone
  16,17-acetophenonide;
12α-methyl-16-dehydrocorticosterone;
12α-methyl-16α-hydroxyhydrocortisone;
12α-methyl-16α-hydroxyhydrocortisone 16,17-acetonide;
12α-methyl-16α-hydroxyhydrocortisone 16,17-
  acetophenonide; and 12α-methyl-11-dehydrocorticosterone and $\Delta^1$-derivatives of all compounds, for 12α-methyl-11-dehydrocorticosterone, there is obtained the corresponding 6β-hydroxy derivative of the respective compounds.

EXAMPLE 3

*12α-methyl-6β-hydroxy-11-dehydrocorticosterone, 6,21-diacetate*

130 mg. of 12α-methyl-6β-hydroxy-11-dehydrocorticosterone is dissolved in 3 ml. of dry pyridine and 1 ml. of acetic anhydride added. After 16 hours at room temperature, the mixture is diluted with ice water and extracted with chloroform. The chloroform is washed successively with 2 N HCl, water, 5% $NaHCO_3$ and water and evaporated to dryness. Chromatography of the residue on a 2 mm. x 15 x 30 cm. plate of alumina (activity V) using chloroform as solvent and eluting the band of $R_f$ 0.4 with ethylacetate gives after evaporation of the solvent and crystallization of the residue 19.5 mg. of 12α - methyl-6β-hydroxy-11-dehydrocorticosterone, 6,21-diacetate, having melting point 210–215°, $[\alpha]_D^{22}$ +113° (chf);

$\lambda_{max.}^{alc.}$ 234 m$\mu$ ($\epsilon$=12,300), $\lambda_{max.}^{nujol}$ 5.74, 5.78, 5.88, 5.98$\mu$

*Analysis.*—Calc'd for $C_{26}H_{34}O_7$ (458.53): C, 68.10; H, 7.47. Found: C, 68.19; H, 7.51.

EXAMPLE 4

Similarly, following the procedure set forth in Example 3, but substituting an equivalent amount of each of the 6-hydroxy derivative compounds obtained in Example 2 for 12α-methyl-6β-hydroxy-11-dehydrocorticosterone, there is obtained the corresponding acetylated derivatives of the respective compounds.

The invention may be variously otherwise embodied within the scope of the appended claims.

What is claimed is:

1. A process for preparing compounds of the formula

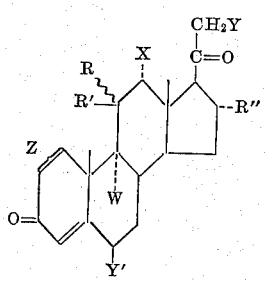

wherein Z is selected from the group consisting of a single and double bond; X is lower alkyl; R' is hydrogen, R is hydroxy, and together R and R' is oxo; Y is selected from the group consisting of hydrogen, hydroxy and acyloxy wherein the acyl radical is of a hydrocarbon carboxylic acid of less than twelve carbon atoms; Y' is selected from the group consisting of hydroxy and acyloxy wherein the acyl radical is of a hydrocarbon carboxylic acid of less than twelve carbon atoms; W is selected from the group consisting of hydrogen and halo; and R'' is selected from the group consisting of hydrogen and hydroxy, which comprises subjecting a compound selected from the group consisting of steroids of the formula

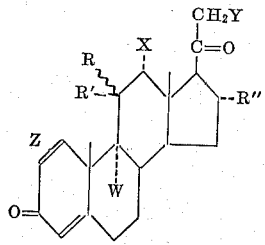

wherein Z, R, R', R'', Y, W and X are as defined above, to the action of a microorganism, *Trichothecium roseum*, and separating and recovering the above recited reaction product.

2. The process of claim 1 in which R'' is hydrogen.

3. The process of preparing 12α-methyl-6β-hydroxy-11-dehydrocorticosterone which comprises subjecting 12α-methyl-11-dehydrocorticosterone steroid to the action of the microorganism *Trichothecium roseum*, and separating and recovering 12α-methyl-6β-hydroxy-11-dehydrocorticosterone.

References Cited by the Examiner

UNITED STATES PATENTS

| 2,844,513 | 7/1958 | Wettstein et al. | 195—51 |
| 2,905,678 | 9/1959 | Sarett et al. | 260—397.45 |
| 3,048,581 | 8/1962 | Fried | 195—51 X |

OTHER REFERENCES

Christensen et al.: J. Am. Chem. Soc., vol. 82, pages 3995–4000, Aug. 5, 1960.

Vischer et al.: Advances in Enzymology, vol. 20, page 242, 1958.

A. LOUIS MONACELL, *Primary Examiner.*

ALVIN E. TANENHOLTZ, *Examiner.*